United States Patent [19]
Ramsey

[11] 3,807,916
[45] Apr. 30, 1974

[54] MOTORIZED DIE HOLDER

[76] Inventor: John C. Ramsey, 498 Island Way, Franklin Lakes, N.J. 07417

[22] Filed: July 6, 1972

[21] Appl. No.: 269,482

[52] U.S. Cl................... 425/113, 425/381, 425/466
[51] Int. Cl.............................................. B29c 27/14
[58] Field of Search........... 425/113, 380, 381, 466; 264/174; 118/125

[56] References Cited
UNITED STATES PATENTS

| | | | |
|---|---|---|---|
| 2,346,697 | 4/1944 | Mungall | 118/125 |
| 2,928,123 | 3/1960 | Ramsey | 425/113 X |
| 2,943,352 | 7/1960 | Van Riper | 425/380 |
| 2,991,504 | 7/1961 | Eppler | 118/125 |
| 3,206,802 | 9/1965 | Van Riper | 118/125 |
| 3,222,721 | 12/1965 | Reynolds, Jr. | 425/113 |
| 3,605,190 | 9/1971 | Christy | 425/113 |
| 3,692,448 | 9/1972 | Menasoff | 425/113 |

*Primary Examiner*—J. Spencer Overholser
*Assistant Examiner*—Robert J. Craig

[57] ABSTRACT

Extrusion die head for sheathing elongated cores such as a cable core travelling through an extrusion head in which the die is mounted. The die is mounted upon stacked slide members which are movable in coordinate directions, such as horizontal and vertical directions relative to each other, whereby the die may be adjusted within limits in any direction in a plane normal to the path of travel of the core and of the fixedly positioned core guide adjacent and in advance of the die. Each of the horizontally and vertically adjustable slide members is selectively adjustably driven in reverse directions by its individual motor. Slide movement measuring means are provided, such means indicating the instantaneous deviation of the respective horizontal and vertical center lines of the die orifice from the corresponding center lines of the cable core guide.

12 Claims, 3 Drawing Figures

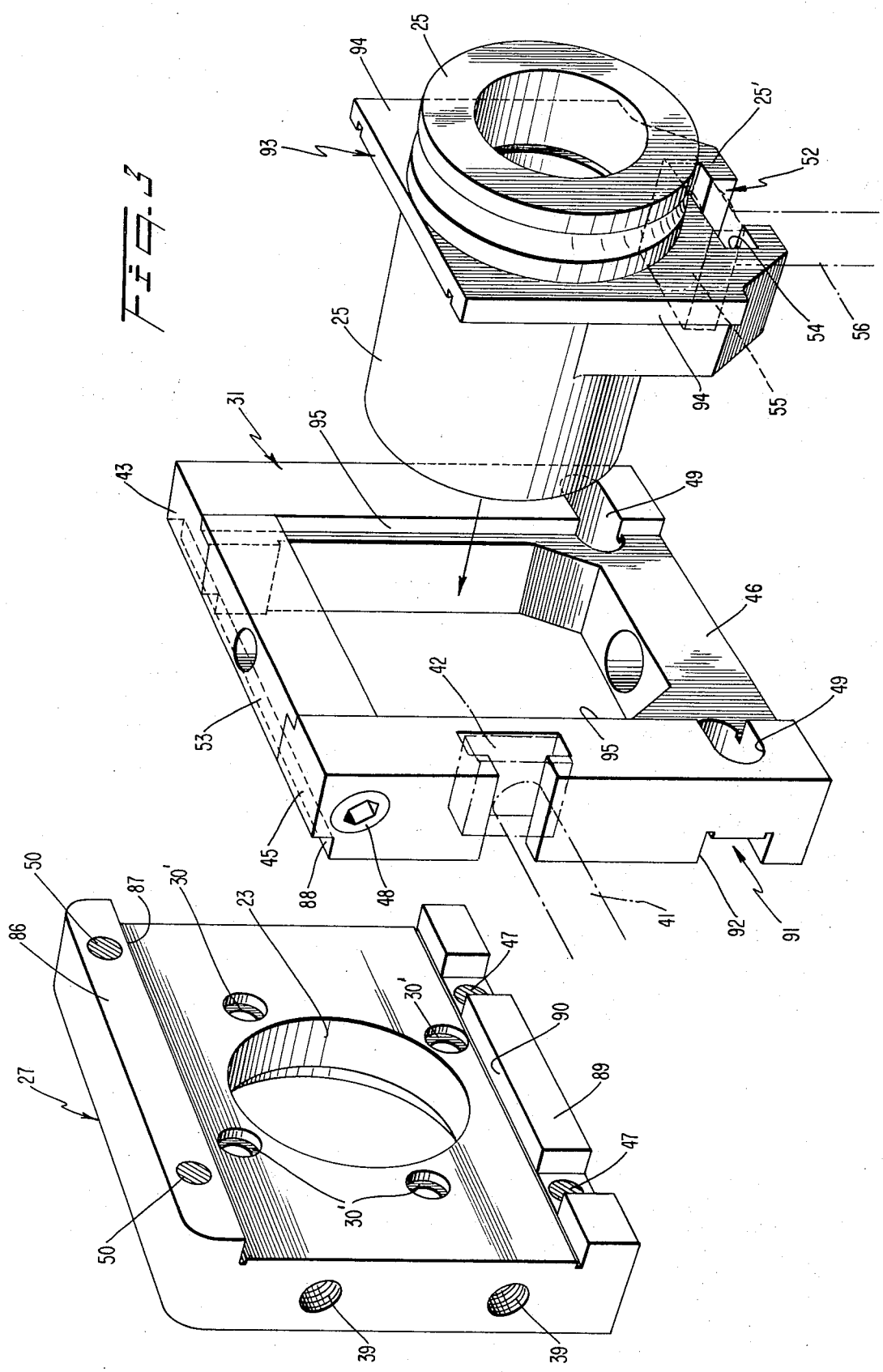

MOTORIZED DIE HOLDER

This invention relates to a plastic material extrusion die head and more particularly relates to an extrusion die head for sheathing a travelling core with plastic material, such die head being provided with motorized means for adjusting the die in coordinate directions in a plane normal to the direction of travel of the core.

Elongated cores such as cable cores are frequently sheathed with curable electrically insulating rubber-like material, the core travelling through a core sheathing plastic material extruding head provided with a die through which the core travels. The extruding head is most frequently of the type known as a crosshead, to which plastic material is forwarded under high pressure by an extruding machine barrel and driven stock screw arrangement. The plastic material passes into the main passage in the crosshead and is then diverted through an angle to pass forwardly and around along a core guide tube disposed in advance of the die, and then through the extrusion die with the core to form a sheath thereabout. It is ordinarily desired that the sheath be of uniform wall thickness and otherwise be as uniform as possible.

Because of unequal pressure conditions in the material after it passes through the crosshead, the sheathing die cannot be positioned with the die passage concentric with the core guide tube if the sheath is to be of uniform wall thickness. Instead, the die is adjusted relative to the core guide tube on an empirical basis, drawing upon previous experience with the sheathing composition being employed, thermal conditions at the extrusion head, etc. The most effective test as to the degree of perfection of the product has been to stop the extrusion machine, cut out a portion of the freshly sheathed cable, and to measure the deviation of the core from concentricity within the sheathed cable. Frequently thereafter the position of the die must be altered to correct the position of the core in the subsequent product. This is not only time-consuming, but is wasteful of the product, which may, until correction of the die position, have its core so far from concentricity as not to be practically usable.

Core sheathing heads of the general type with which the invention is concerned are disclosed, for example, in U.S. Pat. Nos. 2,943,352 and 3,206,802 of J. W. Van Riper. Such patents discuss the problems of obtaining uniform flow of plastic material lengthwise of the main passage in a core sheathing crosshead, and disclose means for reducing the non-uniformity of such flow. They also disclose the conventional construction by means of which the die holder, and thus the die held thereby, are adjusted in a plane disposed normal to the path of travel of the core through the die. Such means takes the form of opposed pairs of screws disposed at right angles with respect to each other and threaded through the wall of the body of the head adjacent the exit end of the longitudinal passage in the head, the inner ends of the set screws engaging the circular cylindrical outer surface of the die holder. By appropriately loosening one or two set screws and screwing the others further in, the die can be adjusted as required. This operation, however, is exacting and time-consuming, since the adjustment of the die along one rectangular coordinate affects its positioning along the other coordinate.

The present invention has among its objects the provision of a core sheathing extrusion die head having improved mechanism for adjusting the die along coordinate directions in a plane of travel normal to the path of travel of the core passing through the die.

Another object is the provision, in a die head, of means for adjusting the die independently in coordinate directions.

Yet another object is the provision of a die head of the type indicated immediately above provided with motor drives for independently adjusting the die along each of two rectangular coordinates.

The above and further objects and novel features of the invention will more fully appear from the following description when the same is read in connection with the accompanying drawings. It is to be understood, however, that the drawings are for the purpose of illustration only and are not intended as a definition of the limits of the invention.

In the drawings, wherein like reference characters refer to like parts through the several views:

FIG. 3 is an exploded view in perspective of the two superimposed slides of the die head, and the member supporting them on the fixed structure of the die head.

Figure 1:
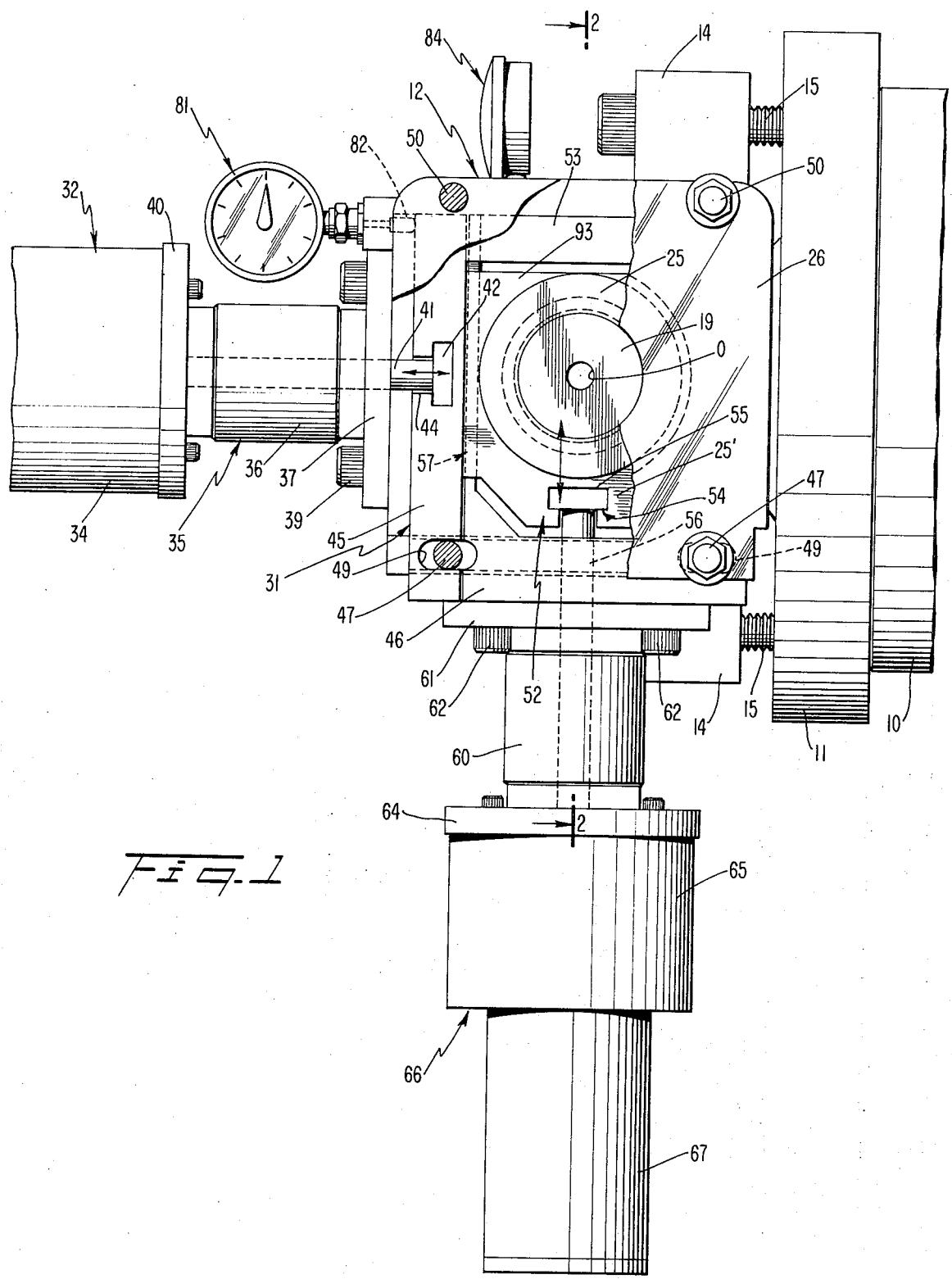
FIG. 1 is a fragmentary view in side elevation of the forward, delivery end of the barrel of a plastic material extruding machine and a motorized die head in accordance with the invention with which the machine is provided, parts of the die head being shown broken away for clarity of illustration.
Figure 2:
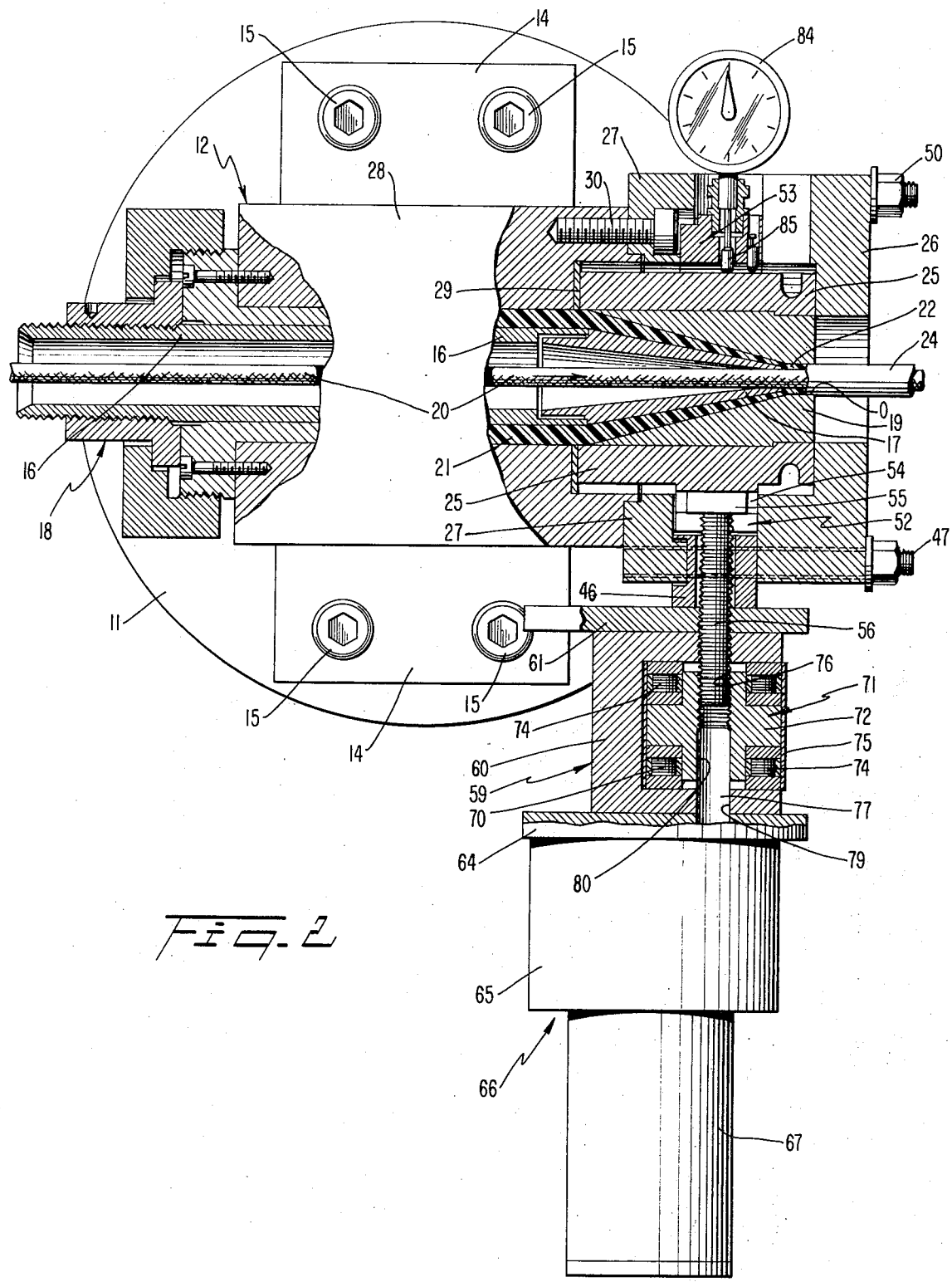
FIG. 2 is a view of the apparatus of FIG. 1, the view being taken partially in end elevation and partially in vertical section, the section being taken along the line 2—2 of FIG. 1.

In FIG. 1 there is shown the forward, delivery end 10 of the barrel of a screw-type plastic material extruding machine, there being an adapter 11 attached to such end of the barrel. A cable-sheathing crosshead 12 is attached to the adapter 11 by means of a plurality of machine screws 15 which extend through upper and lower flanges 14 on the body of the crosshead and are screwed into the adapter 11. As shown in FIG. 2, a guide or guider tube 16, secured at its rear or left-hand end by means generally designated 18 to the body of the head 12, has a guide or guider tip 17 attached to the right-hand end thereof, the guide tip converging in the direction from left to right. The means 18, which is conventional, allows the adjustment of the guider tube along its longitudinal axis and thereafter supports the guider tube in a fixed position. The crosshead is provided with a die 19 having a passage 0 therethrough, the die being adjustable in vertical and horizontal directions with respect to the guide tip 17 in a plane normal to the axis of the passage through tip 17 by the die-adjusting mechanism of the invention. The core 20 of a cable is pulled through the guide tube 16, being accurately guided by the guider tip 17. Cable sheathing, electrically insulating material, such as curable rubber-like or plastic material 21, is forced by the extruding machine into the space in the head 12 presented between the guider tube and the longitudinal cavity in the head and flows in a direction from left to right in FIG. 2 so as to sheath the cable core 20 as the cable core emerges from the right-hand end of the guider tip. There is thus formed a sheathed cable 24, the sheath 22 completely enveloping the cable core. When the die 19 is adjusted relative to the guider tip 17 in the proper manner, the sheathed cable 24 will have the cable 20 accurately centered therewithin, in other words, the sleeve-like plastic material sheathing 22 will be of uniform wall thickness.

The die 19 is held in a sleeve-like die holder 25. There is an annular, step-like shoulder intermediate the length of engagement of the die and die holder which prevents forward movement of the die 19, which is subjected to very substantial forwardly-directed endwise pressure by the plastic material 21 as it travels down the converging mouth of the die toward the exit end thereof. The die holder 25, in turn, in prevented from forward endwise movement with respect to the body of the crosshead by a die binder 26 which is secured to fixed structure of the die head by a plurality of studs 50. The die holder 25 and thus the die 19, however, are free for limited movement in both horizontal and vertical directions in a die holder receiving cavity in the body 28 of the head 12, the die holder being held against axial movement between a slider ring 29 (FIG. 2) in the cavity of the head engaging the rear end surface of the die holder and the rear annular surface of the binder 26 which engages the forward end surface of the die holder 25.

A horizontal guide member 27 (shown most clearly in FIG. 3), generally in the form of a square plate with a round central hole 23 therethrough, is fixedly attached to the body 28 of the crosshead by a plurality of machine screws 30, of which one is shown at the top in FIG. 2, which pass through holes 30' in body 28 (FIG. 3). Member 27 has vertically spaced horizontal lands 86 and 89 which provide opposed horizontal upper and lower guide surfaces 87 and 90, respectively, upon which is mounted a horizontally adjustable vertical slide or guide member 31.

Slide 31 is generally of U-shape, having a right-hand leg 43 (FIG. 3), a left-hand leg 45, and a base or bight portion 46 connecting the lower ends of the two legs. Portion 46 is provided with two horizontally aligned elongated slots 49 which receive two bottom studs 47 therethrough. The studs 47 have their inner ends screwed to the member 27, as shown in FIGS. 2 and 3. Washers and nuts on the outer threaded ends of the studs 47, which extend through holes in the die binder 26, overlie the outer face of the die binder. A pair of similar upper studs 50 extend through the die binder 26 and are also screwed into the element 27.

The upper ends of the legs 43, 45 of slide 31 are tied together by a bar 53 which spans the space between them and is secured thereto by machine screws, of which one is shown at 48 in FIG. 3. The rear faces of members 31, 53 are provided with surfaces which guidingly interfit with the guide surfaces 87 and 90 on member 27. Thus the upper ends of the legs 43, 45 and the tie bar 53 present a horizontal guide surface 88 which engages the surface 87 on member 27. Spaced upwardly from the bottom of slide 31, generally centrally of the height of bottom portion 46 thereof, there is a slot 91 having parallel horizontal walls. Slot 91 accurately receives the land 89 on member 27, the upper wall 92 of the slot slidingly engaging the guide surface 90 on the land 89.

Horizontal adjustment of the slide member 31 is effected by a horizontal geared motor generally designated 32 (FIG. 1) having a gear portion 34, a motor 32 being mounted upon a horizontal motor bracket 35 having a main, generally circular cylindrical part 36 and end flanges 37 and 40. Flange 37 is attached to the horizontal guide member 27 by a plurality of machine screws 39, the motor 32 being affixed to the flange 40 of the bracket. The motor 32, its gear portion 34, and the coupling therefor contained within the bracket portion 36 are the same construction as those of the vertical motor 66, to be described hereinbelow. Briefly, the motor 32 is reversible, and through screw and nut mechanism causes a rod 41 to move axially in reverse directions as shown depending upon the direction of drive of the motor 32. The end of the rod 41 is provided with a head 42 which is accurately received within a T-shaped slot 44 in the left-hand leg 45 of the slide 31.

As above noted, the die holder 25 is mounted upon and is vertically adjustable relative to the horizontally adjustable slide 31. Element 25, which is symmetrical about its vertical central plane, has a depending lower portion 52 thereon which is provided with a T-slot 54. Within the slot 54 there is received the head 55 of a threaded rod 56 which is similar to the rod 41 of the horizontal motor arrangement previously described. Vertical adjustment of the rod 56, in a manner to be described, causes the die holder 25 to be adjusted vertically with respect to the slide 31, there being vertically extending cooperating guide surfaces generally designated 57 in FIG. 1 on slide 31 and die holder 25. The die holder has a slide plate 93 integral therewith, plate 93 having oppositely extending vertical side portions 94. Portions 94 are accurately slidingly received in vertical rabbets in the forward inner edge portions of legs 43, 45 of slide 31.

The means for adjusting member or slide 25 vertical with respect to slide 31 is shown in FIGS. 1 and 2. A vertical coupling, generally designated 59, has a main circular cylindrical body 60, and upper and lower flanges 61 and 64, respectively. Flange 61 is secured to the bottom portion 46 of the member 31 by screws 62. The gear portion 65 of the geared electric motor 66 is secured to the lower flange 64, as shown. The motor 67, like the motor 32 of the horizontal adjusting mechanism is reversible so as selectively to adjust the die holder 25 in a vertical direction. The structure of the coupling 59 is shown in detail in FIG. 2.

The body 60 of the coupling 59 has a circular cylindrical cavity 70 therein offset to the right from the vertical axis of the body 60. The coupling has a main rotatable body 71 in the form of a vertical sleeve with a wide axially centrally disposed thrust-sustaining flange 72 thereon. Thrust bearings 74 are disposed above and below the flange 72, there being races above and below the bearings, the bearings, races, and central flange snugly filling the cavity in the coupling so that the member 71 is held therein virtually without any end play. The coupling is covered by a sleeve-like annular cover 75 as shown.

The sleeve portion of the member 71 at its upper end is internally threaded at 76, the internal threads 76 accurately receiving the threads on the threaded rod 56. It will be apparent that rotation of the member 71 in opposite directions will impell the rod 56 and thus the die holder 25 in opposite vertical directions. The geared portion 65 of the gear motor 66 has a power delivery shaft 77 which is provided with a vertically extending spline 79 thereon, the spline 79 being accurately received within a keyway or slot 80 in the lower portion of the sleeve of the member 71. Thus rotation of the motor 67 in opposite directions will drive the shaft 77 in opposite directions and, through the spline and keyway connection 79, 80 will drive the member 71 in opposite directions.

The horizontal and vertical adjusting motors 32 and 66 are under the control of conventional reversing switches (not shown) which may be mounted on a suitable control panel for the extrusion machine. Assuming that the guider tube 16 and the guider tip 17 are maintained in one predetermined position after having been adjusted longitudinally, concentricity of the cable core 20 in the sheathed product 24 is achieved by adjusting the die holder, and thus the die, suitably in horizontal and vertical directions in a plane normal to the longitudinal axis of the guider tube. Such condition of concentricity can be determined by periodic tests conducted upon the sheathed product 24, or by the use of suitable concentricity-determining apparatus, such as that shown and described in U.S. Pat. No. 2,274,735, dated Mar. 3, 1942, or U.S. Pat. No. 2,604,512, dated July 22, 1952.

Various means may be provided to indicate the instantaneous position of the die holder and die from their zero position, which is taken to be that wherein the extruding passage through the die lies coaxial of the guider tube tip 17. One example of suitable indicating means is shown herein wherein there are provided dial micrometers which detect the amount of deviation of the axis of the die passage in both the horizontal and vertical directions from a condition of concentricity with the guider tube. Thus a first dial micrometer 81, fixedly mounted upon the fixed member 27, has its plunger 82 engaging the left-hand edge of the horizontally adjustable member 31. A second dial micrometer 84, fixedly mounted upon the tie bar 53 (FIG. 2), has its plunger 85 engaging the upper edge of the die holder 25.

It will be understood, however, that other means for determining and indicating the instantaneous horizontal and vertical positions of the die holder may be employed, such as means indicating the number of revolutions in a given direction which the respective couplings have made from the position in which the die passage lies concentric of the guider tube. It is also to be understood that the motorized die holder of the present invention may be automatically operable, being governed by concentricity-measuring mechanism whereby deviations of a cable core from the center of a sheath are immediately detected. The horizontal and vertical adjusting motors 32 and 66 may be connected to such concentricity-measuring mechanism whereby such motors are operated automatically upon deviations of the core from its central position, whereby immediately to correct such deviation.

Although the invention is illustrated and described with reference to a singular preferred embodiment thereof, it is to be expressly understood that it is in no way limited to the disclosure of such a preferred embodiment, but is capable of numerous modifications within the scope of the appended claims.

I claim:

1. In an extrusion die head for sheathing a core with plastic material as the core travels forwardly therethrough, said head having a chamber therein for receiving and conducting forwardly plastic material delivered to the die head under pressure, said head having a core guide tube disposed in said chamber, a die at the outer, forward end of the chamber, the core passing through the core guide tube on its way forwardly to the die, the die being adjustable in a plane normal to the axis of the core guide tube, the improved means for adjusting the die comprising means for guiding the die along each of two coordinate axes disposed at right angles to each other, and means for independently adjusting the die along each of said axes, the adjustment of the die along one of said coordinate axes not affecting its positioning along the other of said coordinate axes.

2. A die head according to claim 1, comprising means for selectively adjusting the die in reverse directions along a first coordinate axis, and separate means for selectively adjusting the die in reverse directions along the second coordinate axis.

3. A die head according to claim 1, wherein the means for guiding the die comprises a guide member affixed to the outer, forward end of the die head, said guide member having first rectilinear guide means disposed in a plane normal to the longitudinal axis of the guide tube, said first guide means extending parallel to a first coordinate axis, a first slide guidingly mounted on the first guide means of the first guide member, means for adjusting the first slide along said first axis, second rectilinear guide means on the first slide extending parallel to a second coordinate axis disposed at right angles to the first coordinate axis, a second slide guidingly mounted on the second guide means, and means mounting the die on the second slide.

4. A die head according to claim 3, comprising means for selectively adjusting the first slide in reverse directions along a first coordinate axis, and separate means for selectively adjusting the second slide in reverse directions along the second coordinate axis.

5. A die head according to claim 4, wherein the means for selectively adjusting the second slide comprises gear means for adjustably traversing the second slide with respect to the first slide, and a reversible prime mover drivingly connected to said gear means.

6. A die head according to claim 5, wherein the prime mover is supported upon and moves with the first slide.

7. A die head according to claim 5, wherein the gear means comprises a screw and cooperating nut, and the prime mover comprises a reversible electric motor.

8. A die head according to claim 4, wherein the means for selectively adjusting the first slide comprises gear means for adjustable traversing the first slide, and a reversible prime mover drivingly connected to said gear means.

9. A die head according to claim 8, wherein the gear means comprises a screw and cooperating nut, and the prime mover comprises a reversible electric motor.

10. A die head according to claim 1, comprising means for indicating the distance through which the axis of the die is offset from the axis of the passage through the guide tube along each of said coordinate axes.

11. A die head according to claim 10, wherein the indicating means comprises separate means for indicating the distance of offset of the die along the respective coordinate axes.

12. A die head according to claim 11, wherein each of separate indicating means comprises a dial micrometer.

* * * * *